US009213914B2

(12) United States Patent
Oka

(10) Patent No.: US 9,213,914 B2
(45) Date of Patent: Dec. 15, 2015

(54) IMAGE PROCESSING DEVICE AND IMAGE PROCESSING METHOD FOR PROCESSING IMAGES USING MEMORY-EFFICIENT PRINCIPAL COMPONENT ANALYSIS

(71) Applicant: SONY COMPUTER ENTERTAINMENT INC., Tokyo (JP)

(72) Inventor: Masaaki Oka, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 92 days.

(21) Appl. No.: 13/866,147

(22) Filed: Apr. 19, 2013

(65) Prior Publication Data

US 2014/0010460 A1    Jan. 9, 2014

(30) Foreign Application Priority Data

Jul. 6, 2012 (JP) .................................. 2012-152989

(51) Int. Cl.
*G06K 9/46* (2006.01)
*G06K 9/48* (2006.01)
*G06K 9/62* (2006.01)

(52) U.S. Cl.
CPC ........ *G06K 9/481* (2013.01); *G06K 9/46* (2013.01); *G06K 9/6247* (2013.01); *G06K 2009/4666* (2013.01)

(58) Field of Classification Search
None
See application file for complete search history.

(56) References Cited

U.S. PATENT DOCUMENTS 6,879,716 B1 *   4/2005   Ishibashi ..................... 382/166
2013/0148883 A1 *   6/2013   Lee ............................. 382/165

FOREIGN PATENT DOCUMENTS

JP    2004-7274    1/2004

OTHER PUBLICATIONS

Brayer, John. "Introduction to Fourier Transforms for Image Processing." Introduction to the Fourier Transform. N.p., Jan. 12, 2010. Web. Nov. 25, 2014.*
Ho, Pun-Mo, Tien-Tsin Wong, and Chi-Sing Leung. "Compressing the illumination-adjustable images with principal component analysis." Circuits and Systems for Video Technology, IEEE Transactions on 15.3 (2005): 355-364.*
Wang, Ze, et al. "Data compression on the illumination adjustable images by PCA and ICA." Signal Processing: Image Communication 19.10 (2004): 939-954.*

* cited by examiner

*Primary Examiner* — Chan Park
*Assistant Examiner* — Geoffrey E Summers
(74) *Attorney, Agent, or Firm* — Katten Muchin Rosenman LLP

(57) ABSTRACT

A pixel set formation unit in an image analysis unit of an image processing device forms pixel sets from original images subject to analysis. A principal analysis unit of the image analysis unit performs principal component analysis in units of pixel sets. A synthesis unit synthesizes results of analysis in units of pixel sets so as to generate images of eigenvectors of a size of the original images. An image generation unit displays the images of the eigenvectors and stores data for an image generated by using the images of the eigenvectors in a generated image storage unit.

4 Claims, 12 Drawing Sheets

IMAGE PROCESSING DEVICE AND IMAGE PROCESSING METHOD FOR PROCESSING IMAGES USING MEMORY-EFFICIENT PRINCIPAL COMPONENT ANALYSIS

BACKGROUND OF THE INVENTION

1. Field of the Invention

The present invention relates to an image processing device for analyzing and processing acquired images and to an image processing method used in the device.

2. Description of the Related Art

Image analysis technologies using principal component analysis for the purpose of recognizing a pattern of a subject (e.g. a human face), compressing data, etc., are proposed (see, for example, Japanese Patent Laid Open Publication 2004-7274). Principal component analysis is one type of multivariate analysis and is capable of deriving a dominant factor in interpreting a distribution by identifying an eigenvector having a large eigenvalue from a correlation matrix or a variance-covariance matrix of a multidimensional vector. Principal component analysis as applied to image analysis is capable of recovering an original image from a small amount of data or identifying similarity between images, by using pixel values of an image as input data and using linear coupling of eigenvectors calculated from the data.

Principal component analysis is extremely useful means in the field of image processing in that it is capable of systematically understanding the overall characteristic of an image that a human being can normally perceive at a glance. However, principal component analysis requires pixel values as input data and so involves a far larger amount of parameters as compared with ordinary information analysis. This results in a problem in that, the higher the resolution of an image subject to processing, the narrower the scope of application of the technology due to the constraints on processing capabilities and resources of the device.

RELATED ART LIST

JPA laid open 2004-7274

SUMMARY OF THE INVENTION

The present invention addresses the problem and a purpose thereof is to provide an image processing technology capable of performing principal component analysis and using the result of analysis in a stable manner regardless of the resolution of the image or the resources of the device.

One embodiment of the present invention relates to an image processing device. The image processing device comprises: a principal component analysis unit configured to subject a plurality of original images to principal component analysis; a display unit configured to display images of eigenvectors representing principal components obtained as a result of the principal component analysis; and an image generation unit configured to acknowledge user input related to adjustment of an image generated by using the images of eigenvectors, and to store the data for the image generated as a result in a storage device or to output the data to a display device.

Another embodiment of the present invention also relates to an image processing device. The image processing device comprises: an eigenvector reader unit configured to read data for eigenvectors obtained as a result of subjecting a plurality of original images to principal component analysis, from a storage device; and an image generation unit configured to acknowledge user input related to adjustment of an end image generated by using images of the eigenvectors, and to store the data for the end image generated as a result in a storage device or to output the data to a display device.

Still another embodiment of the present invention relates to an image processing method. The image processing method comprises: reading data for a plurality of original images from a storage device or an input device and subjecting the data to principal component analysis; causing a display device to display images of eigenvectors representing principal components, the images obtained as a result of the principal component analysis; and acknowledging user input related to adjustment of an image generated by using the images of eigenvectors, and storing the data for the image generated as a result in a storage device or outputting the data to a display device.

Optional combinations of the aforementioned constituting elements and implementations of the invention in the form of methods, apparatuses, systems, and computer programs may also be practiced as additional modes of the present invention.

DETAILED DESCRIPTION OF THE INVENTION

Figure 1:
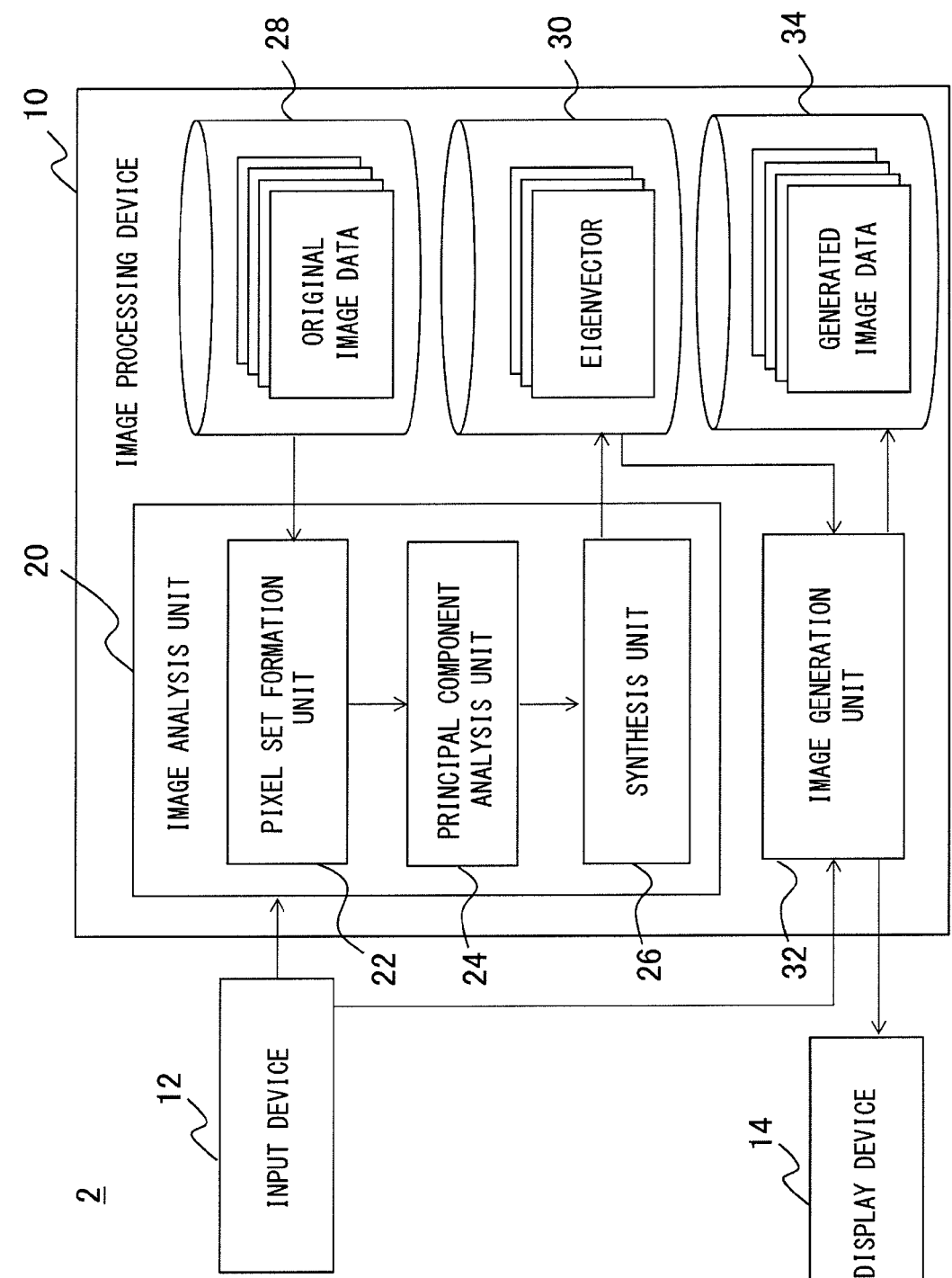
FIG. 1 shows the configuration of the image processing system according to the embodiment.

The invention will now be described by reference to the preferred embodiments. This does not intend to limit the scope of the present invention, but to exemplify the invention.

According to the embodiment, a plurality of original images as a whole are subject to principal component analysis so that eigenvectors representing principal components are visualized as images. Given that N original images are subject to analysis, principal component analysis is performed in the following order. Input data items $I_1$-$I_N$ for the respective original images subject to analysis are generated as follows.

$$I_1=(p_1(1),p_1(2),p_1(3),p_1(4),\ldots,p_1(m))$$

$$I_2=(p_2(1),p_2(2),p_2(3),p_2(4),\ldots,p_2(m))$$

$$I_3=(p_3(1),p_3(2),p_3(3),p_3(4),\ldots,p_3(m))$$

$$\ldots$$

$$I_N=(p_N(1),p_N(2),p_N(3),p_N(4),\ldots,p_N(m))$$

where $p_n(i)$ denotes the i-th value occurring when the components of the pixel values of the pixels defined as the input data for the n-th image are listed in a predetermined order of pixels. In other words, the maximum value m of i is equal to the number of pixels (input data) multiplied by the number of components of each pixel (3 in the case of an RGB image). From these input data items $I_1$-$I_N$, the following correlation matrix is generated.

$$\begin{bmatrix} a(1)\cdot a(1), & a(1)\cdot a(2), & a(1)\cdot a(3), & \ldots, & a(1)\cdot a(m) \\ a(2)\cdot a(1), & a(2)\cdot a(2), & a(2)\cdot a(3), & \ldots, & a(2)\cdot a(m) \\ a(3)\cdot a(1), & a(3)\cdot a(2), & a(3)\cdot a(3), & \ldots, & a(3)\cdot a(m) \\ & & \ldots & & \\ a(m)\cdot a(1), & a(m)\cdot a(2), & a(m)\cdot a(3), & \ldots, & a(m)\cdot a(m) \end{bmatrix}$$

where a(i) is a vector including as its component a difference of the i-th pixel value of each image from the average value. Given that the average value is denoted by ave(i), a(i) is given by the following expression.

$$a(1)=(p_1(1)-\text{ave}(1),p_2(1)-\text{ave}(1),p_3(1)-\text{ave}(1),\ldots,p_N(1)-\text{ave}(1))$$

$$a(2)=(p_1(2)-\text{ave}(2),p_2(2)-\text{ave}(2),p_3(2)-\text{ave}(2),\ldots,p_N(2)-\text{ave}(2))$$

$$a(3)=(p_1(3)-\text{ave}(3),p_2(3)-\text{ave}(3),p_3(3)-\text{ave}(3),\ldots,p_N(3)-\text{ave}(3))$$

$$\ldots$$

$$a(m)=(p_1(m)-\text{ave}(m),p_2(m)-\text{ave}(m),p_3(m)-\text{ave}(m),\ldots,p_N(m)-\text{ave}(m))$$

The correlation matrix is subject to eigenvalue decomposition so as to determine the eigenvalue and the eigenvector. The eigenvector corresponding to the maximum eigenvalue is labeled as the first principal component e1, followed by the second principal component e2, the third principal component e3, . . . in descending order of the eigenvalues. Generally, eigenvectors having an eigenvalue of 1 or larger are extracted as principal components. Since the eigenvector is a m-dimensional vector, each array of pixels obtained by processing the m-dimensional vector in a process opposite to the process of turning the input data I (original image) into the m-dimensional vector will result in an image.

By linearly coupling the eigenvectors e1, e2, e3, . . . , i.e., by linearly coupling the images obtained by the eigenvectors, as indicated below, the original image can be recovered, or specific components can be given more weight, or intermediate images can be generated.

$$G(x,y)=\text{ave}(x,y)+K1*e1(x,y)+K2*e2(x,y)+K3*e3(x,y)+\ldots$$

where G(x, y) and ave(x, y) respectively denote pixel values at positional coordinates (x, y) in a generated image and an average image, and e1(x, y), e2(x, y), e3(x, y), . . . denote pixel values at positional coordinates (x, y) in the respective images of the eigenvectors. By varying the coefficients K1, K2, K3, . . . for linear coupling, the image can be changed in a variety of manners.

By subjecting an image as a whole to principal analysis in one setting, the image of the eigenvector corresponding to the original image can be obtained so that the user can visually select the component of the image for the purpose to give more weight or the like. This results in an advantage in that a desired image can be generated at will and with ease. Lately, images are usually expected to be at a high resolution so that the following problem arises. The size m of the dimension of the input data I corresponding to a single image is the horizontal resolution of the image×the vertical resolution×the number of components in a pixel. The correlation matrix of the m-dimensional input data like this will have elements in m rows and m columns, i.e., a total of (horizontal resolution× vertical resolution×number of components in a pixel)$^2$ elements.

In the case of an RGB image having 1024×768 pixels, for example, the data size of the correlation matrix will be (1024× 768×3)×(1024×768×3)×4=about 22 TB. While it is necessary to load the correlation matrix in a memory temporarily in order to obtain an eigenvector, it is difficult to store data of this size in an ordinary memory. The embodiment addresses this by dividing a single image into a plurality of pixel sets by forming pixel sets derived from extracting a predetermined number of pixels from the original image, and defining the pixel set as a unit of input data.

FIG. 1 shows the configuration of the image processing system according to the embodiment. The elements depicted in FIGS. 1 and 12 as functional blocks for performing various processes are implemented by hardware such as a CPU, a GPU, a memory, or other LSI's, and by software such as a programs etc., for image processing and various operations, which is loaded into a memory from a storage device or a storage medium. Therefore, it will be obvious to those skilled in the art that the functional blocks may be implemented in a variety of non-limiting manners by hardware only, software only, or a combination of thereof.

An image processing system 2 includes an input device 12 for acknowledging an instruction related to image processing from the user, an image processing device 10 for analyzing an image according to principal component analysis and generating necessary data, and a display device 14 for displaying a screen for acknowledging an input or displaying the generated image. The image processing device 10 includes an image analysis unit 20 for performing principal component analysis and determining an eigenvector, an image generation unit 32 for using the eigenvector to generate image data that complies to the user's request, an original image storage unit 28 for storing the original image subject to analysis, an eigenvector storage unit 30 for storing eigenvectors, and a generated image storage unit 34 for storing data for images generated by using the eigenvectors.

Since the process performed by the image analysis unit 20 and the process performed by the image generation unit 32 can be run independently, the units 20 and 32 may not be co-located in a device but may be configured as separate devices having respective functions. The image processing device 10 may further include functions for running a game, displaying content, or processing information by incorporating the images generated by using the eigenvectors. The data for the original image may be originally acquired by a separate device and then imported from the acquiring device via a recording medium, or may be acquired from a server via a network before being stored in the original image data storage unit 28. Alternatively, the image processing device 10 may be provided inside an imaging device such as a camera so that the captured image is immediately stored in the original image data storage unit 28. Alternatively, the data for the original image may be directly fed from another device to the image analysis unit 20, bypassing the original image data storage unit 28.

The input device 12 acknowledges a user input for an instruction to start image analysis, to select an image subject to analysis, or the like. The input device 12 communicates the acknowledged input to the image analysis unit 20. Further, the input device 12 acknowledges a user input related to designation of an image (e.g. an image of an eigenvector) desired to be displayed or to generation of a new image using the designated image. The input device 12 communicates the acknowledged input to the image generation unit 32. The input device 12 may be implemented by any commonly used input device such as a mouse, a keyboard, a controller, and a joystick. The input device 12 may be a touch panel mounted on the screen of the display device 14. The display device 14 may be implemented by a liquid crystal display, a plasma display, or the like, capable of displaying images alone. Alternatively, the display device 14 may be implemented by a combination of a projector for projecting images and a screen.

The image analysis unit 20 includes a pixel set formation unit 22 for forming a pixel set from an original image subject to analysis, a principal component analysis unit 24 for subjecting each pixel set to principal component analysis, and a synthesis unit 26 for synthesizing the results of analyzing the pixel sets. The pixel set formation unit 22 reads data for a plurality of designated images from the original data storage unit 28 in accordance with a user instruction to analyze an image acknowledged by the input device 12. The pixel set formation unit 22 divides the pixels constituting the respective images into pixel sets, organizing the pixels in groups each including a predetermined number of pixels.

Pixels belonging to a given set may be a block of pixels resulting from dividing the original image or pixels extracted according to a predetermined rule (e.g. every several pixels). Alternatively, pixels may be extracted at random. In any way, pixels identically located in a plurality of images subject to analysis are extracted. The number of pixels included in a single pixel set is pre-set in consideration for the capacity of a memory (not shown) used for loading the correlation matrix by the principal component analysis unit 24. The principal component analysis unit 24 generates, for each image, vectors each including as its elements the pixel values of the pixels belonging to a single pixel set. The principal component analysis unit 24 uses the vectors as the input data items $I_1$-$I_N$ described above, and subjects the data items to principal component analysis. The principal component analysis unit 24 derives, for each pixel set, eigenvectors e1, e2, e3, ... representing principal components of the plurality of original images.

The synthesis unit 26 synthesizes the eigenvectors determined for the respective pixel sets, in consideration for the original pixel arrangement. This obtains images of the eigenvectors corresponding to the principal components at the size of the original image. The image data for the eigenvectors thus generated is stored in the eigenvector storage unit 30. The image generation unit 32 renders images of the eigenvectors read from the eigenvector storage unit 30, in accordance with a user instruction or the like, and causes the display device 14 to display the images. The image generation unit 32 further causes the display device 14 to display an image generated by linearly coupling the eigenvectors and acknowledges user control of the generated image. More specifically, the image generation unit 32 acknowledges designation of an eigenvector desired to be given more weight or an eigenvector desired to be given less weight, or acknowledges control of the coefficient. The data for the image generated in this way is output to and displayed on the display device 14 or stored in the generated image storage unit 34.

Figure 2:
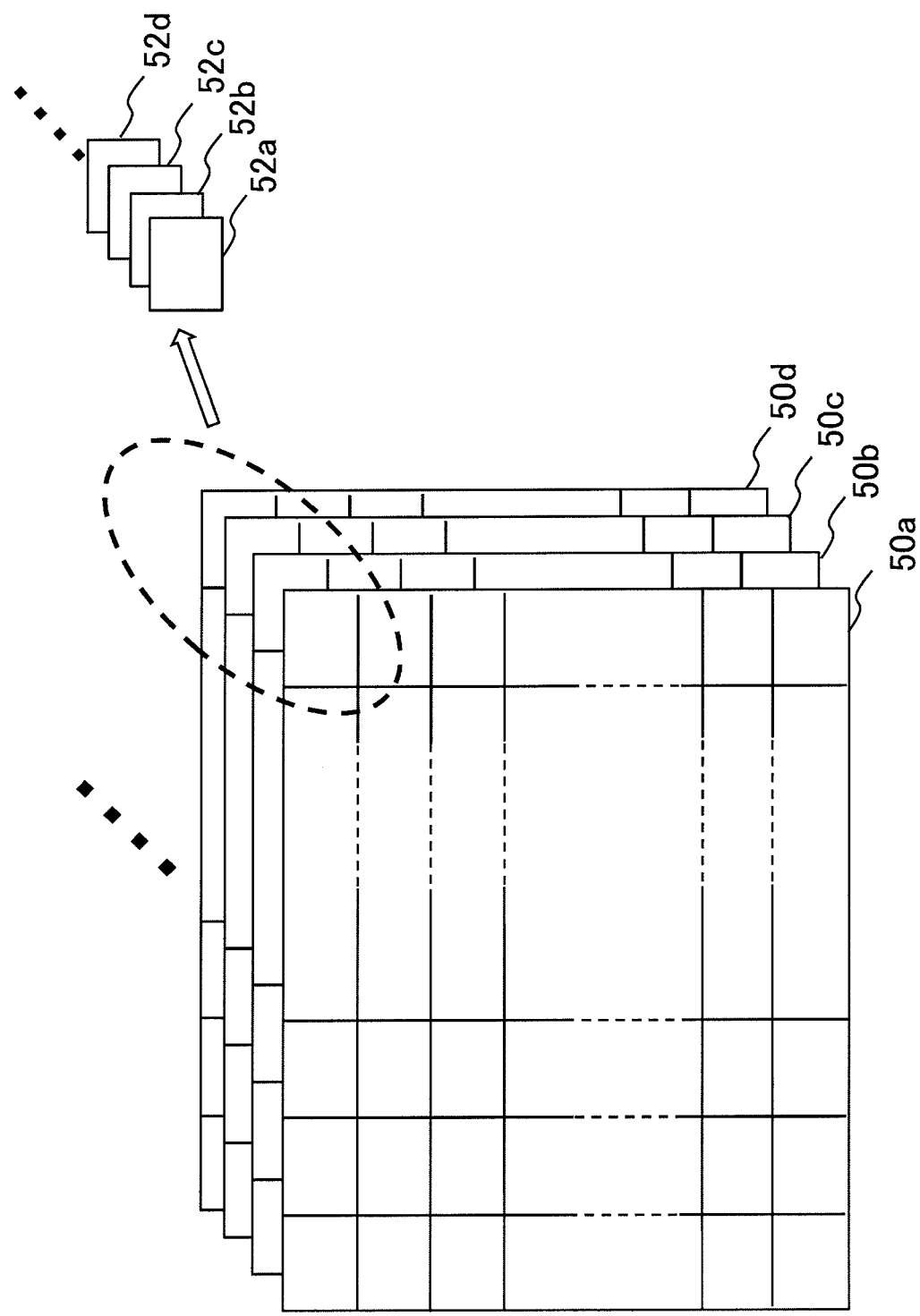
FIG. 2 schematically shows a method of dividing an image into blocks and forming a pixel set block by block, according to the embodiment.

A description will now be given of a method whereby the pixel set formation unit 22 extracts pixels to form a pixel set from an image. FIG. 2 schematically shows a method of dividing an image into blocks and forming a pixel set block by block. According to this method, pixel sets (e.g. pixel sets 52*a*, 52*b*, 52*c*, 52*d*, ... ) are formed for the blocks of a predetermined size produced by dividing original images 50*a*, 50*b*, 50*c*, 50*d*, ... subject to analysis. For example, by dividing an original image by 16 both vertically and horizontally, 256 pixel sets are formed for a single original image.

Pixel values of N pixel sets formed from blocks identically located in N original images subject to analysis are defined as input data items $I_1$-$I_N$ subject to principal component analysis. For example, by dividing an RGB image including 1024× 768 pixels by 16 both vertically and horizontally, the input data item will be 64×48×3 dimensional, and the data size of the correlation matrix will be (64×48×3)×(64×48×3)× 4=about 340 MB. In this way, the correlation matrix can be properly loaded into an ordinary memory.

Figure 3:
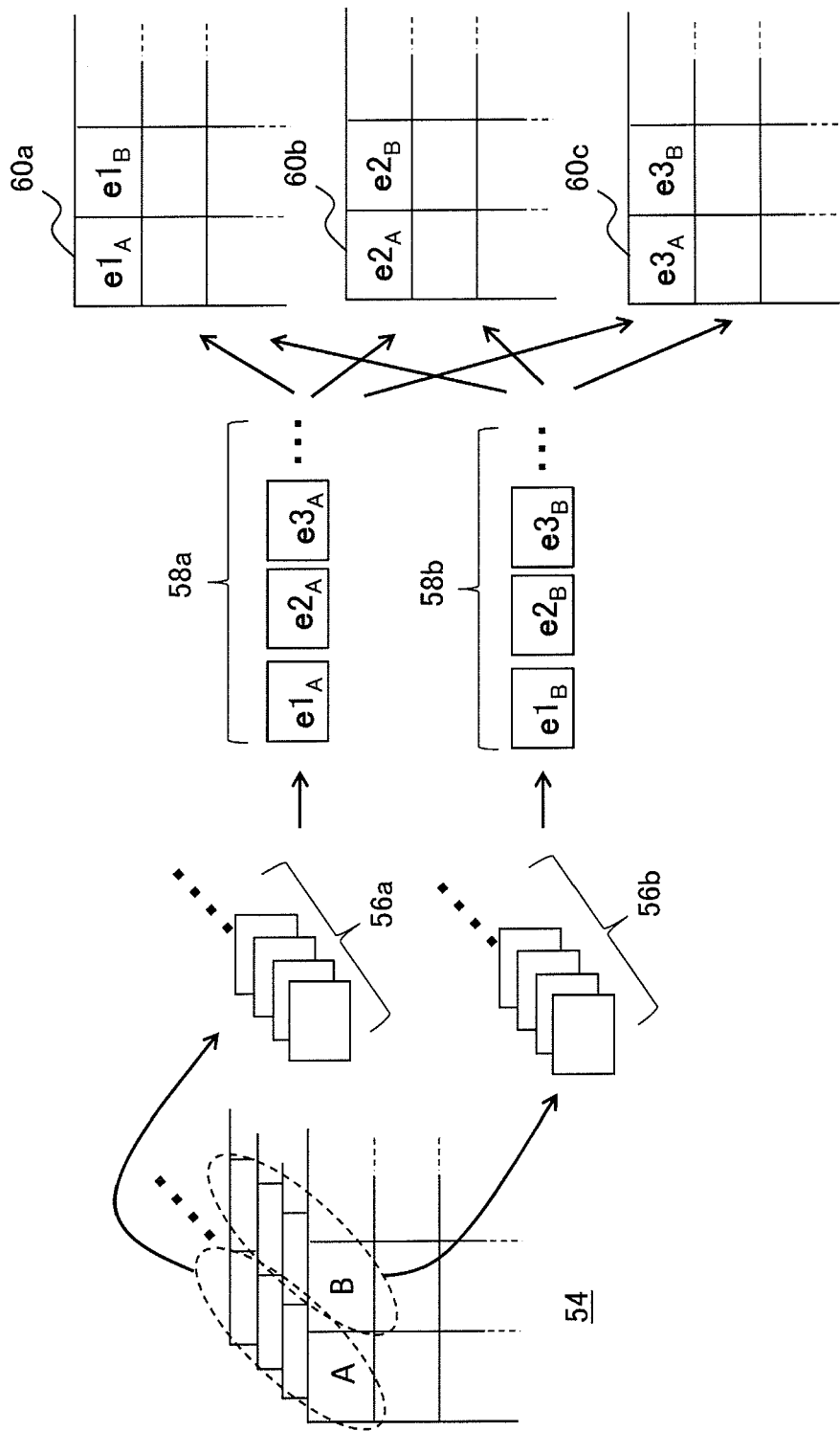
FIG. 3 shows the locations, within the images, of units of input data used in principal component analysis and of eigenvectors produced as a result, according to the embodiment.

The principal component analysis unit 24 repeats subjecting the blocks produced from the division to principal component analysis over the entirety of the original images. In the case of dividing the image by 16 both vertically and horizontally, principal component analysis is repeated 256 times. This obtains eigenvectors corresponding to principal components for each block. FIG. 3 shows the locations, within the images, of units of input data used in principal component analysis and of the eigenvectors obtained from the data.

As mentioned above, each of a plurality of original images 54 subject to analysis are divided into blocks of a predetermined size. The figure shows two of those blocks as block A and block B to represent the blocks. The following description equally applies to the other blocks. By extracting pixels that form block A, block B, ... from the respective original images, sets 56*a*, 56*b*, ... of pixel sets are formed for respective blocks. Each of the sets 56*a*, 56*b*, ... of pixel sets is defined as a unit of input data and subjected to principal component analysis.

As a result, eigenvectors representing principal components are obtained for each block. The figure shows that an eigenvector set 58*a* composed of eigenvectors $e1_A$, $e2_A$, $e3_A$, ... is obtained for block A, and an eigenvector set 58*b* composed of eigenvectors $e1_B$, $e2_B$, $e3_B$, ... is obtained for block B. As mentioned above, the eigenvectors are ordered according to the size of the associated eigenvalue.

The synthesis unit 26 uses the eigenvectors thus obtained to reconstruct the images of the eigenvectors of the size commensurate with the image plane of the original images. More specifically, the synthesis unit 26 generates block images of the eigenvectors by rearranging the eigenvectors in the image planes of the original blocks. Moreover, the synthesis unit 26 connects block images of the same rank vertically and horizontally in the order of arrangement of blocks in the original image. This produces an image 60*a* of the first principal component, an image 60*b* of the second principal component, an image 60*c* of the third principal component, ... corresponding to the original images.

Figure 4:
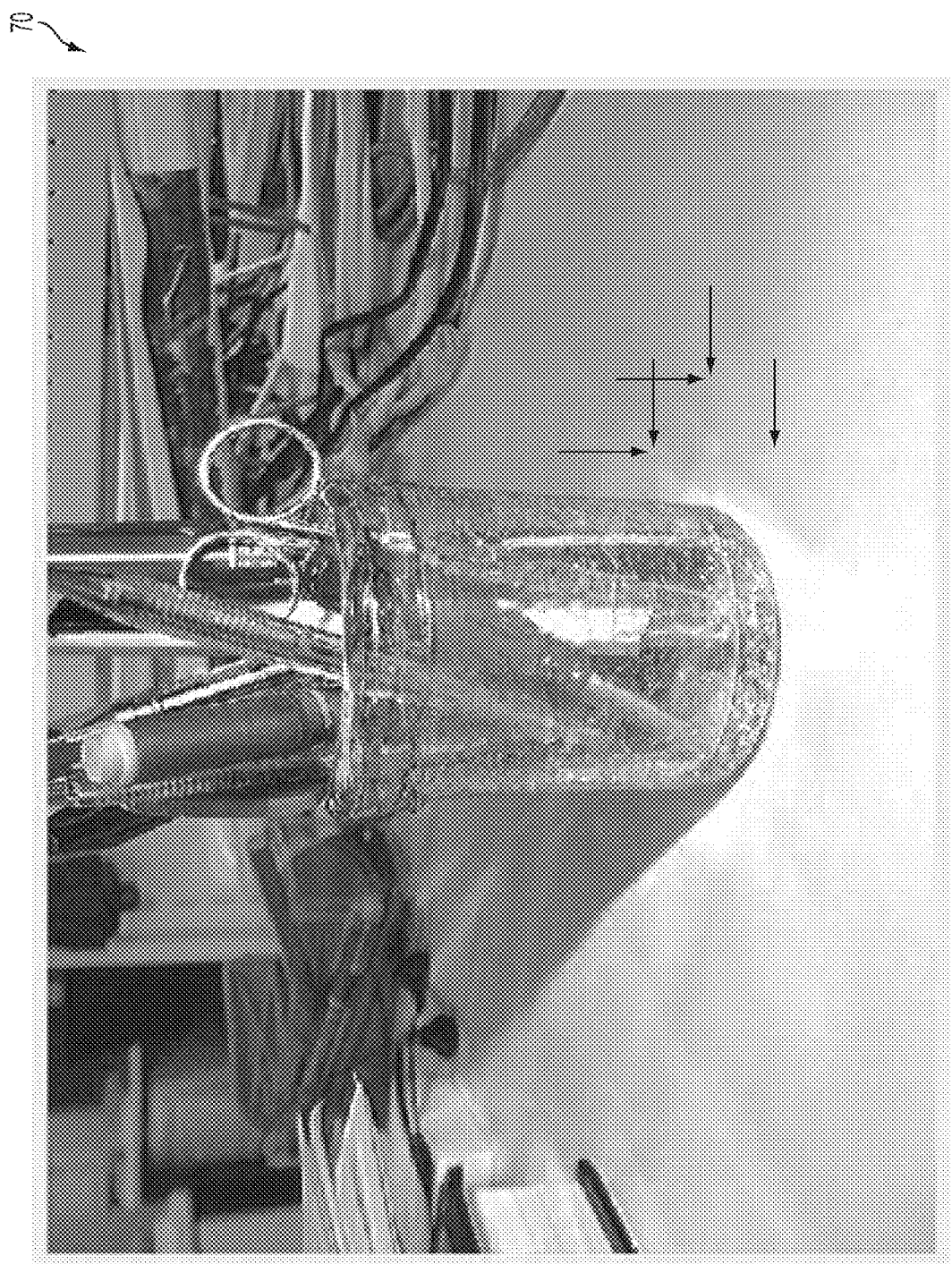
FIG. 4 is an exemplary image recovered by using the eigenvectors obtained as a result of dividing the image into blocks and subjecting the blocks to principal analysis, according to the embodiment.

FIG. 4 is an exemplary image recovered by using the eigenvectors obtained as a result of dividing the images into blocks and subjecting the blocks to principal analysis. A recovered image 70 is an image obtained by linearly coupling the image 60a of the first components, the image 60b of the second components, and the image 60c of the third components obtained as described above, using appropriate coefficients. The original image capturing a space around a penholder is recovered. However, a close look at the image reveals boundaries between blocks in directions indicated by the arrows for example.

This is due to the fact that the eigenvectors produced as a result of block-by-block principal component analysis are differently ordered from one block to another. By ordering the eigenvectors in each block according to the magnitude of the eigenvalue, the order of eigenvectors representing the same components may be reversed between blocks due to the noise included in the pixel values, computational errors, or the like. By concatenating the images of the eigenvectors of the same rank in the presence of misalignment of the order, different components will be mixed in a single image. Block noise created as a result will be visible as a boundary.

Figure 5:
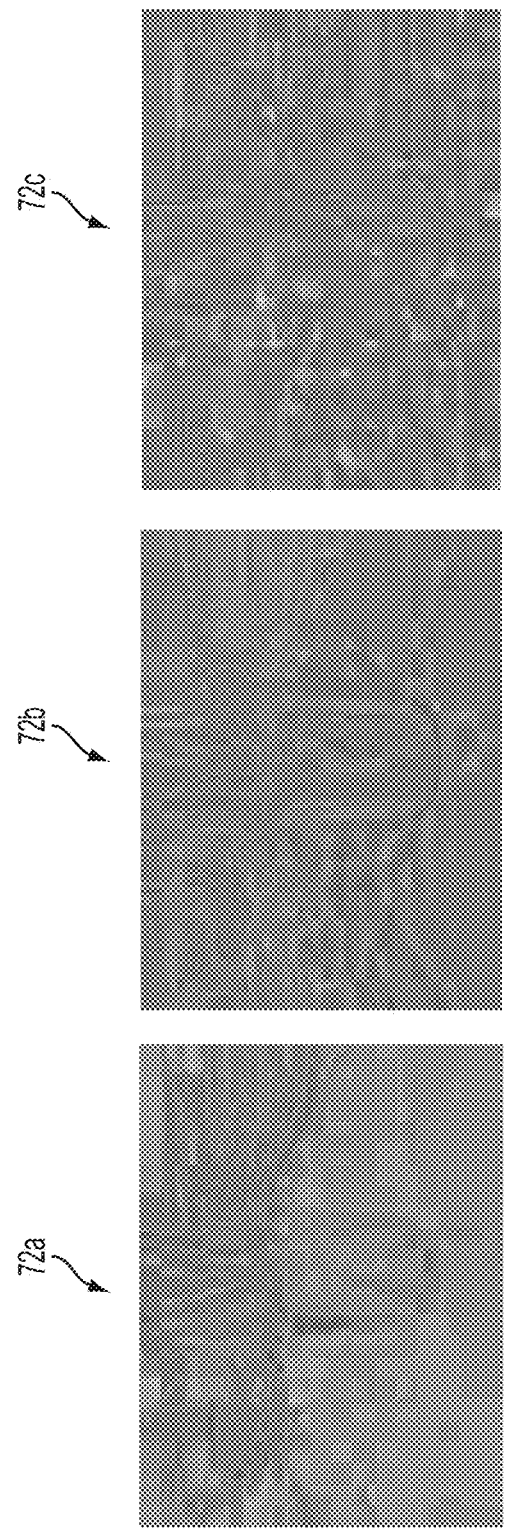
FIG. 5 shows images of eigenvectors used to generate the recovered image of FIG. 4.

FIG. 5 shows images of eigenvectors used to generate the recovered image 70 of FIG. 4. It is revealed from an image 72a of the first principal component, an image 72b of the second principal component, and an image 72c of the third principal component that block noise is progressively noticeable in the stated order. Consequently, boundaries between blocks will become easily visible in an image generated by linearly coupling these images, like the recovered image 70, depending on the content of the image.

Figure 6:
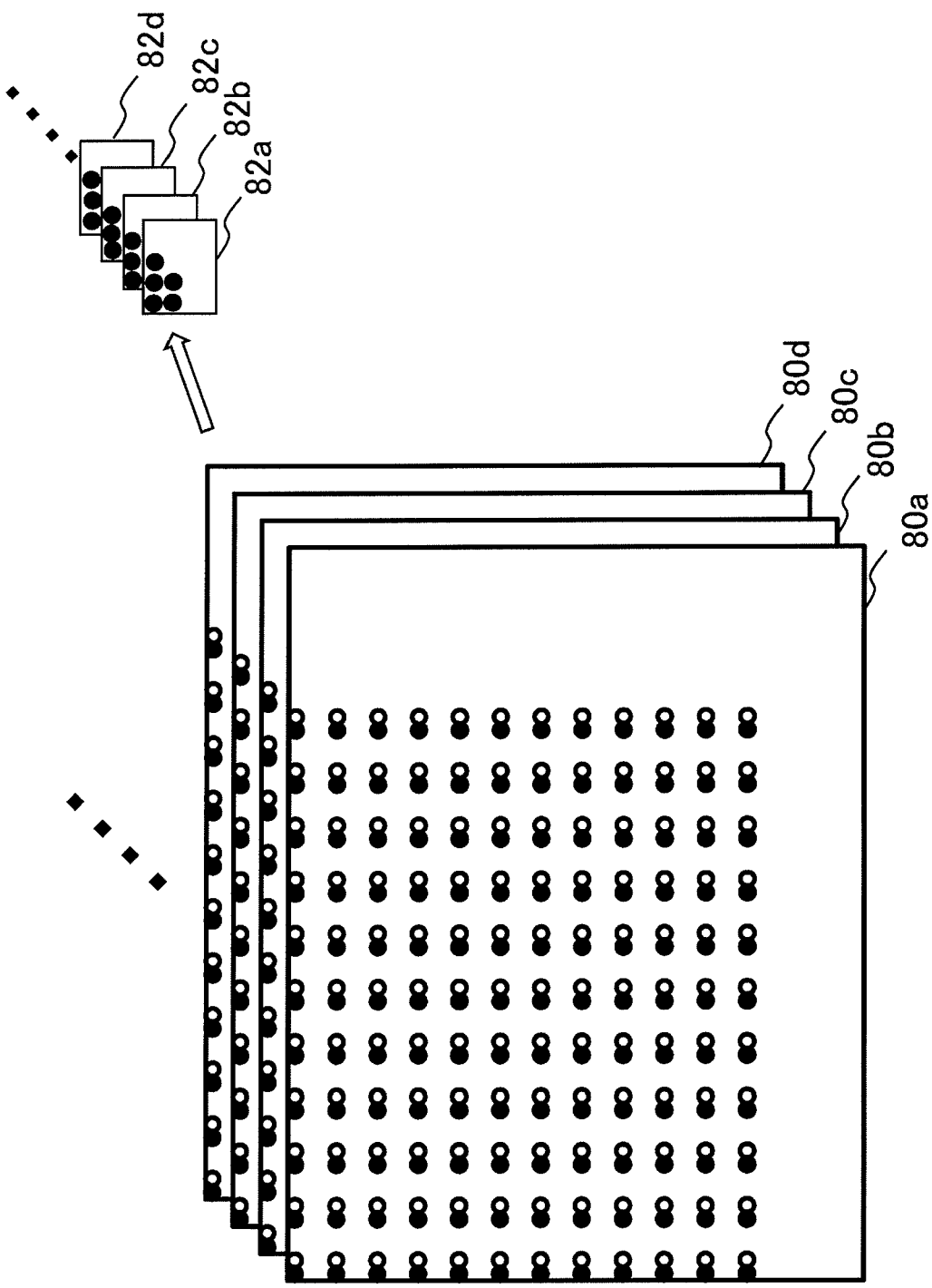
FIG. 6 schematically shows a method of extracting pixels at equal intervals from original images, according to the embodiment.

FIG. 6 schematically shows another exemplary method of extracting pixels to form pixel sets, whereby pixels are extracted at equal intervals. In this method, pixels (e.g. filled circles) are extracted at predetermined intervals both vertically and horizontally from original images 80a, 80b, 80c, 80d, . . . subject to analysis. The extracted pixels are defined as pixel sets 82a, 82b, 82c, 82d, . . . . By repeatedly extracting hitherto unextracted pixels (e.g. unfilled circles) at the same intervals from the original images 80a, 80b, 80c, 80d, . . . , the entirety of each image is divided into pixel sets.

Pixel values of N pixel sets extracted from identical location in N images subject to analysis are defined as input data items $I_1$-$I_N$ subject to principal component analysis. For example, when pixels are extracted at intervals of 15 pixels both vertically and horizontally from an RGB image including 1024×768 pixels, the resultant data size will be the same as that of the case of FIG. 2 where a pixel set is formed for each block formed by dividing an image by 16 both vertically and horizontally. The principal component analysis unit 24 repeats subjecting all sets of pixel sets produced by dividing the original images to principal component analysis. By considering the pixel sets 82a, 82b, 82c, 82d, . . . as blocks, the subsequent process will be the same as that of the case where the image is divided into blocks.

However, the elements of eigenvectors obtained by a single event of principal component analysis correspond to pixels at discrete positions in the original images. Therefore, the synthesis unit 26 reconstructs the image of the first principal component, the image of the second principal component, the image of the third principal component . . . corresponding to the original images, by returning the elements of the eigenvectors obtained from the sets of pixel sets to the pre-extraction positions of the corresponding pixels.

Figure 7:
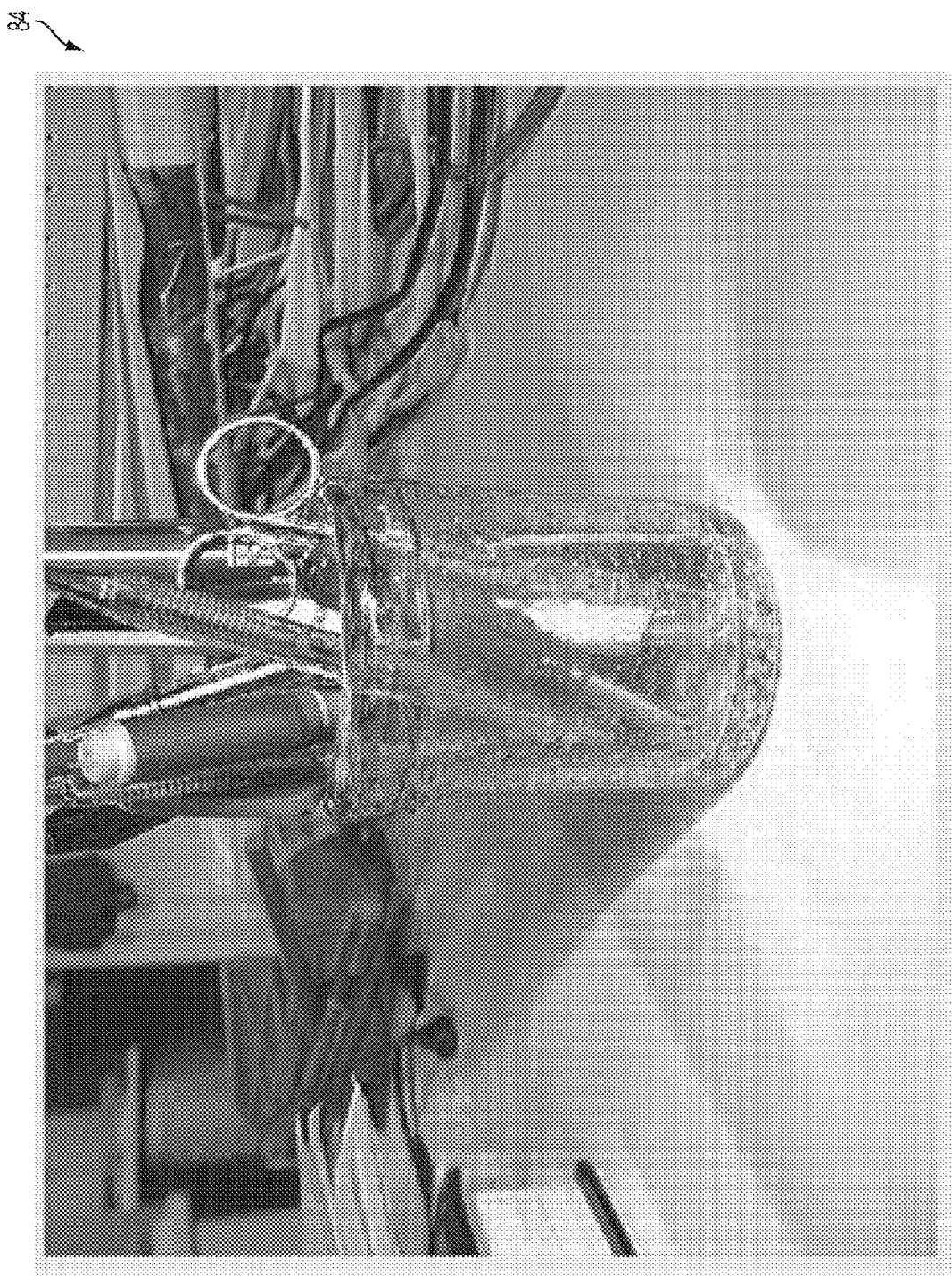
FIG. 7 is an exemplary image recovered by using the eigenvectors obtained as a result of subjecting pixels extracted at equal intervals from the original images to principal analysis, according to the embodiment.

FIG. 7 is an exemplary image recovered by using the eigenvectors obtained as a result of subjecting pixels extracted at equal intervals from the original images to principal analysis. The original images are the same as those of FIG. 4. A recovered image 84 is an image obtained by linearly coupling the images, generated as described above, of the eigenvectors representing the principal components, using appropriate coefficients. As compared with the recovered image 70 of FIG. 4, the image is free of noise in a unit of brad region which looks like boundary between blocks. However, a closer look reveals noise in a stripe pattern primarily in the vertical direction.

Figure 8:
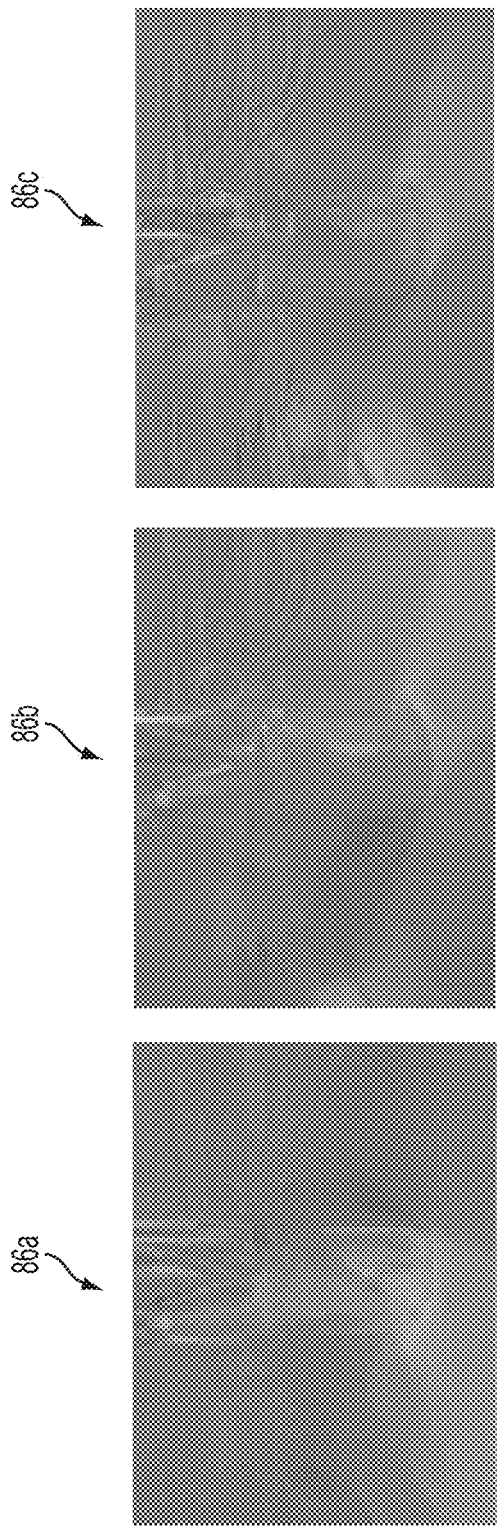
FIG. 8 shows images of eigenvectors used to generate the recovered image of FIG. 7.

This is caused by the fact that, as in the case of the block noise described above, different components are mixed in a single image of an eigenvector as a result of the eigenvectors produced by subjecting the sets of pixel sets to principal analysis being differently ordered from one set of pixel sets to another. FIG. 8 shows images of eigenvectors in this case. By an examination of an image 86a of the first principal component, an image 86b of the second principal component, and an image 86c of the third principal component, fine noises which looks like vertical and horizontal stripes at an interval commensurate with a unit of pixel are visible particularly in the image 86b of the second principal components.

Figure 9:
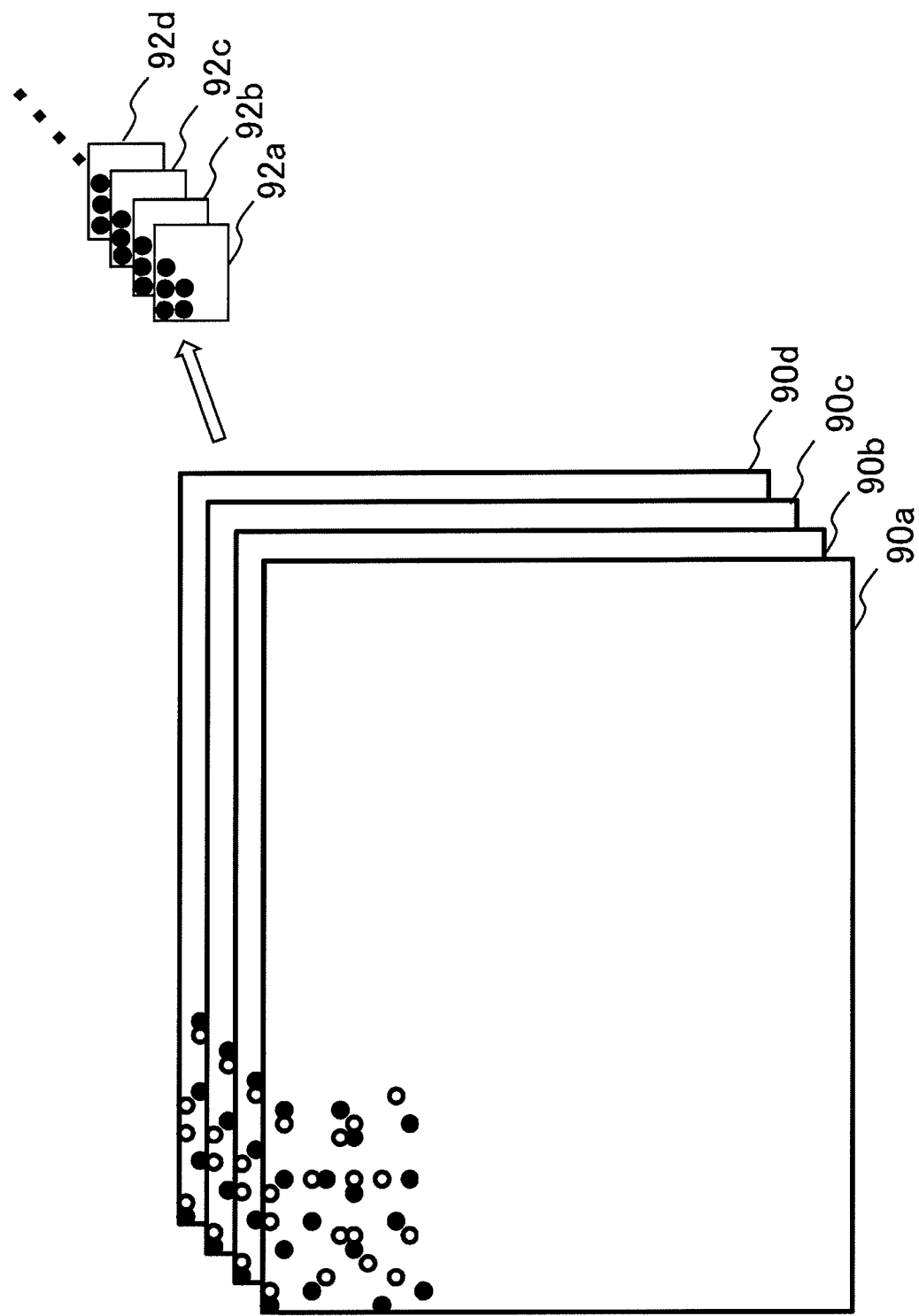
FIG. 9 schematically shows a method of extracting pixels at random from original images, according to the embodiment.

FIG. 9 schematically shows another exemplary method of extracting pixels to form pixel sets whereby pixels are extracted at random (irregularly) from original images. In this method, pixels (e.g. filled circles) are extracted at random from original images 90a, 90b, 90c, 90d, . . . subject to analysis. The extracted pixels are defined as pixel sets 92a, 92b, 92c, 92d, . . . . By repeatedly extracting hitherto unextracted pixels (e.g. unfilled circles) similarly from the original images 90a, 90b, 90c, 90d, . . . , the entirety of each of the images is divided into pixel sets. Preferably, selection of the positions from which the pixels are extracted to form a given pixel set is unbiased as much as possible. For this purpose, extraction target are determined by generating a random number or a pseudo-random number to select positional coordinates of the pixels, for example.

Pixel values of N pixel sets extracted from identical location in N images subject to analysis are defined as input data items $I_1$-$I_N$ subject to principal component analysis. For example, when 64×48=3072 pixels are extracted at a time from an RGB image including 1024×768 pixels, the resultant data size will be the same as that of the case of FIG. 2 where a pixel set is formed for each block formed by dividing an image into by 16 both vertically and horizontally. The principal component analysis unit 24 repeats subjecting all sets of pixel sets produced by dividing the original images to principal component analysis. By considering the pixel sets 92a, 92b, 92c, 92d, . . . as blocks, the subsequent process will be the same as that of the case where the image is divided into blocks.

However, as in the method of extracting pixels at equal intervals, the elements of eigenvectors obtained by a single event of principal component analysis correspond to pixels at discrete positions in the original images. Therefore, the synthesis unit 26 reconstructs the image of the first principal component, the image of the second principal component, the image of the third principal component . . . corresponding to the original images, by returning the elements of the eigenvectors obtained from the sets of pixel sets to the pre-extraction positions of the corresponding pixels.

Figure 10:
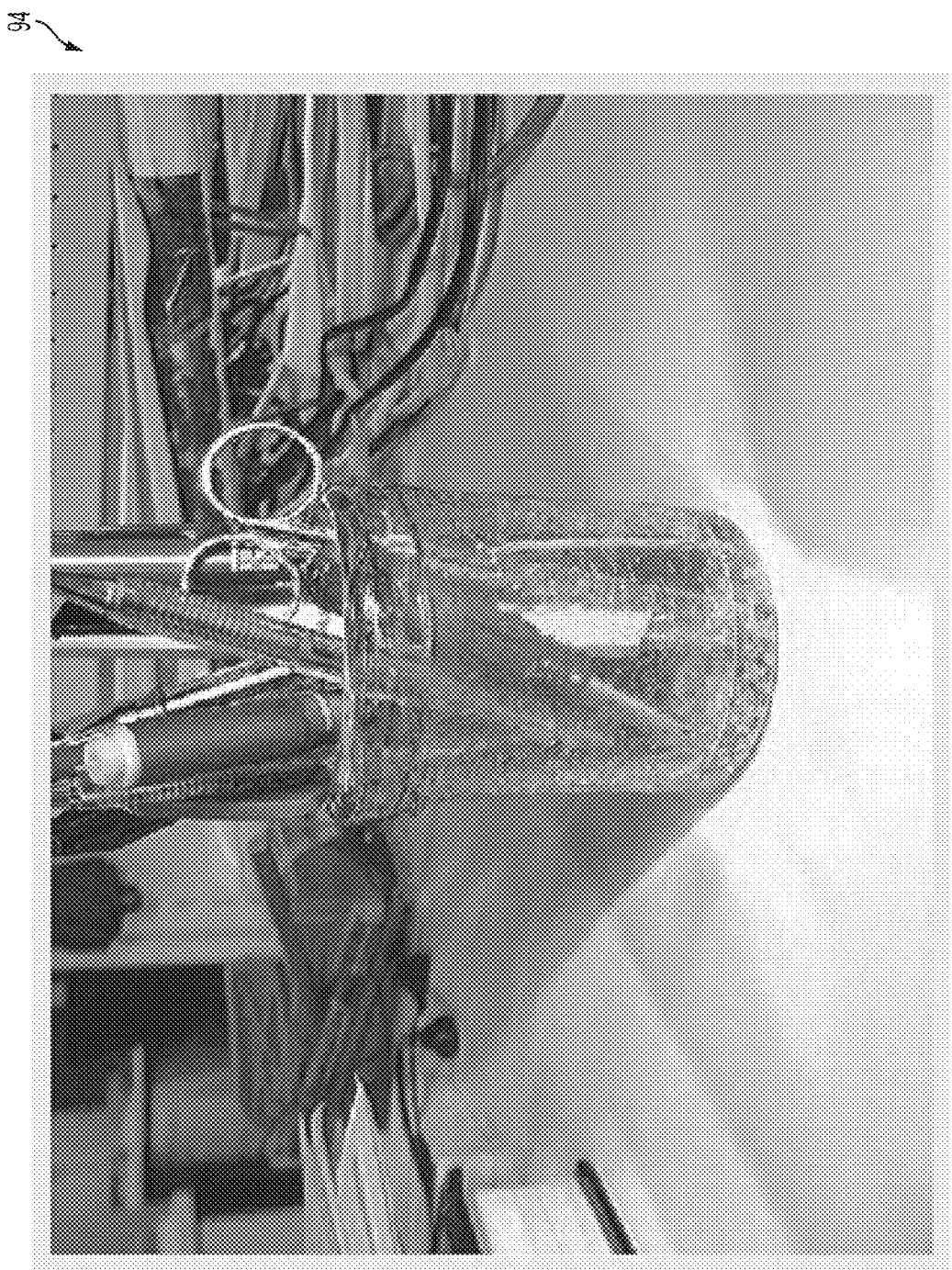
FIG. 10 is an exemplary image recovered by using the eigenvectors obtained as a result of subjecting pixels extracted at random from the original images to principal analysis, according to the embodiment.

FIG. 10 is an exemplary image recovered by using the eigenvectors obtained as a result of subjecting pixels extracted at random from the original images to principal analysis. The original images are the same as those of FIG. 4. A recovered image 94 is an image obtained by linearly coupling the images, generated as described above, of the eigenvectors representing the principal components, using appropriate coefficients. As compared with the recovered image 70 of FIG. 4 and the recovered image 84 of FIG. 7, the image is free of noise that shows itself as boundaries or as a stripe pattern. This is because, even if the eigenvectors produced as a result of subjecting the sets of pixel sets to principal component analysis are differently ordered from one set of pixel sets to another, the elements in an eigenvector will be sporadically located within the screen due to the random positions of the corresponding pixels in the image plane.

"Random", i.e. "irregular", extraction according to this embodiment may not be strictly "irregular" in the sense that the positions of the pixels extracted at a time are completely unrelated. In other words, even if there is some rule in the relative positions of the extracted pixels, that should still qualify as "irregular" so long as the extracted pixels are so sporadically located that they are not continuous over a length that is visible or do not form some shape such as a line or a rectangle. So long as the above definition is met, a plurality of predefined patterns of extraction should qualify as "irregular". Any of these extraction methods that are broadly defined as "irregular" may be successfully used to prevent boundary or stripe-pattern noise from becoming visible as shown in FIG. 10.

Figure 11:
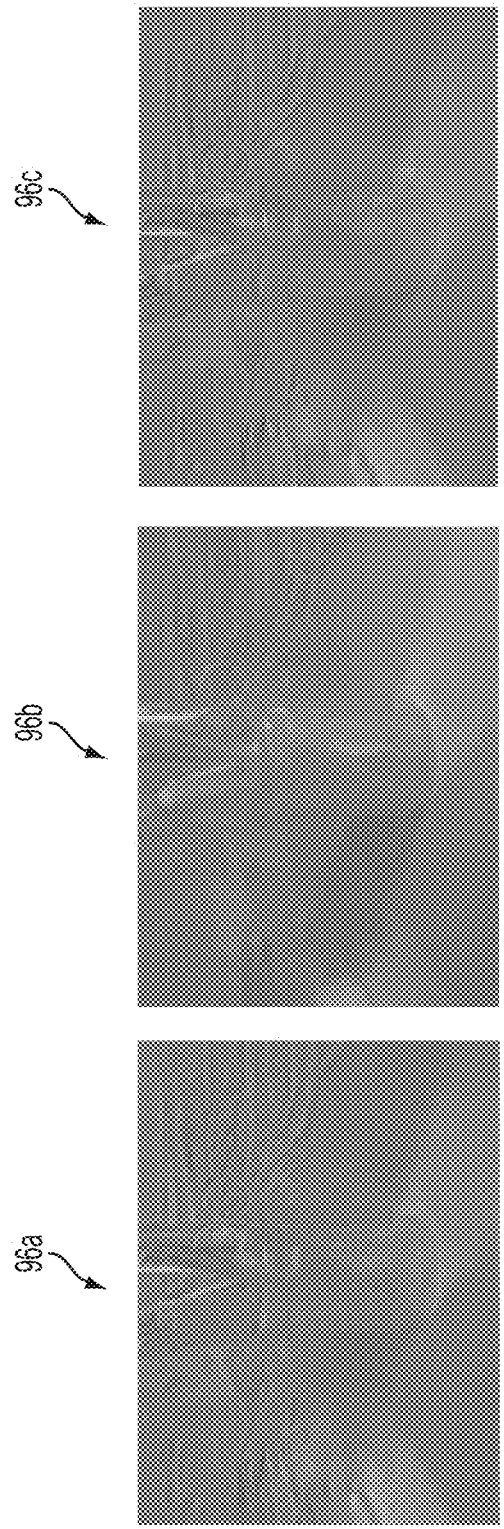
FIG. 11 shows mages of eigenvectors used to generate the recovered image of FIG. 10.

FIG. 11 shows an image 96a of the first components, an image 96b of the second components, and an image 96c of the third components used in this case. Since the pixels forming each pixel set are sporadically located, noise resulting from dividing the image is not visible in any of the images. As thus far described, a plurality of methods are feasible as means to extract pixels to form pixel sets. As far as the generation of noise is concerned, the method of extracting pixels at random is considered to be most useful. Meanwhile, the load required to extract pixels or to reconstruct an image will be smaller in the case of simpler methods such as block division. In view of such an advantage, it may be desirable to select an extraction method such as block division or equal-interval extraction in circumstances where noise is less likely to be visible (e.g., where the original images contain high-frequency components in large quantity).

For this reason, the pixel set formation unit 22 may subject the original images to image analysis (e.g. frequency analysis) and adaptively select an extraction method based on the result of analysis. Further, the pixel set formation unit 22 may extract pixels using different methods depending on the area in the original images. In case the extraction method is adaptively varied, a table that maps the results of image analysis (e.g. frequency characteristics) to appropriate extraction methods may be prepared so that the pixel set formation unit 22 can refer to the table. The pixel set formation unit 22 may communicate the selected extraction method, information related to the position of the pixels forming a pixel set in the image plane, etc. to the synthesis unit 26. The synthesis unit 26 reconstructs images of eigenvectors based on the communicated information.

The image generation unit 32 reads the image data for the eigenvectors generated as described above from the eigenvector storage unit 30 and displays the images on the display device 14. The image generation unit 32 varies the coefficient or gives more weight to or deletes a selected eigenvector in accordance with a user operation so as to generate the ultimate data for the image requested by the user, storing the generated data in the generated image storage unit 34. The ultimate data for the image is a data set including the data for the images of the eigenvectors and the associated coefficient, which are used for linear coupling.

Figure 12:
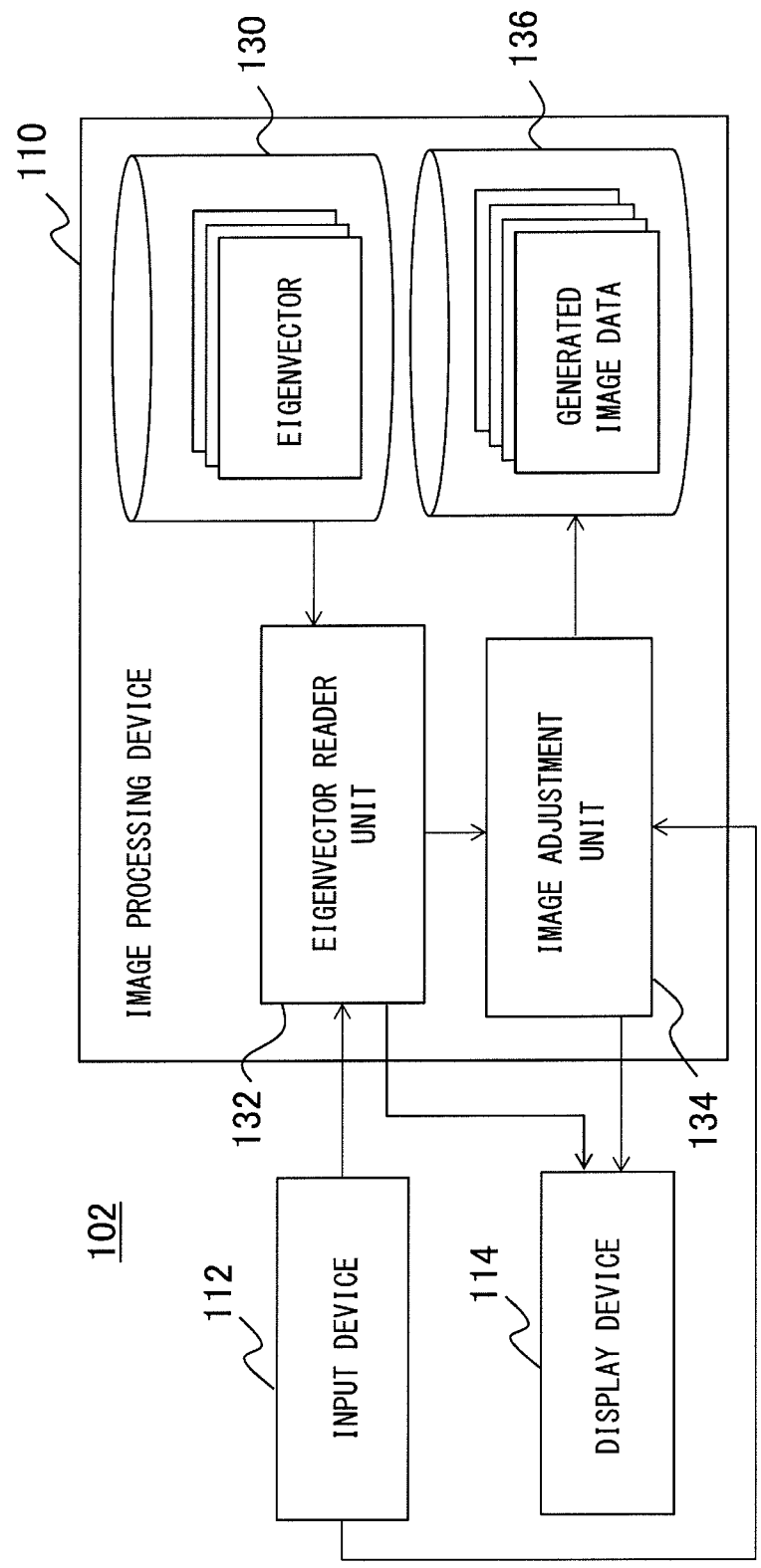
FIG. 12 shows the configuration of the image processing system equipped with the capabilities to generate an image using images of eigenvectors, according to the embodiment.

As described above, the function of the image generation unit 32 may be isolated from the function of generating eigenvectors by principal component analysis so that the functions may be implemented in separate devices. FIG. 12 shows the configuration of the image processing system equipped with the capabilities to generate an image using images of eigenvectors. An image processing system 102 includes an input device 112 for acknowledging a user instruction related to image generation, an image processing device 110 for generating image data in accordance with the user instruction, and a display device 114 for displaying necessary data. The input device 112 and the display device 114 are configured similarly as the input device 12 and the display device 14 of FIG. 1, respectively.

The image processing device 110 includes an eigenvector storage unit 130 for storing eigenvectors, an eigenvector reader unit 132 for reading an eigenvector subject to processing, an image adjustment unit 134 for controlling the coefficient, etc., according to the user's request so as to adjust the image to be generated, and a generated image storage unit 136 for storing the data for the generated image. The eigenvector storage unit 130 and the generated image storage unit 136 are configured similarly as the eigenvector storage unit 30 and the generated image storage unit 34 of FIG. 1, respectively.

The eigenvector reader unit 132 and the image adjustment unit 134 correspond to the image generation unit 32 of FIG. 1. Therefore, the following operations may similarly be performed by the image generation unit 32. The eigenvector storage unit 130 stores images of eigenvectors fed in the form of a set of image data via a network or a recording medium. The images of the eigenvectors may be subject to compression coding as appropriate. The eigenvector reader unit 132 acquires the name of image data or the like designated by the user via the input device 112 and reads the corresponding data of images of eigenvectors from the eigenvector storage unit 130. The data for the eigenvectors may be acquired from the input device 112. The read image is displayed on the display device 114 and also supplied to the image adjustment unit 134.

The display device 114 displays, for example, an arrangement of all images of eigenvectors as shown in FIG. 5. In association with this, the display device 114 also shows an image generated by linearly coupling the images of the eigenvectors. The display device 114 also displays the coefficients of the respective eigenvectors in such a manner that the coefficients are adjustable. In other words, the display device 114 displays a window that accepts direct entry of a coefficient value or a GUI of a slider so as to acknowledge entry for increment and decrement of the coefficients. The image adjustment unit 134 acquires information on the coefficient value, information on the increment or decrement of the coefficient, and information on the selection of an image of an eigenvector, which are input by the user via the input device 112. The image adjustment unit 134 recalculates the result of linear coupling according to the information. The image adjustment unit 134 updates the display of the image generated as a result. Once the user enters an instruction for finalizing the image, the image adjustment unit 134 organizes a set including the data for the eigenvectors and the coefficients used to display the image into the group and stores the group in the generated image storage unit 136 as the data for the generated image.

The original images subject to the process according to the embodiment may be still images or frames from moving images. In the case of moving images, the coefficient may be defined for a set of a plurality of frames. By visualizing eigenvectors as images, it is possible to increase or decrease components of shade or light as viewed or to accentuate only the motion of an object. By using still images captured with varying the direction of light source as original images and varying the coefficients over time, it is possible to generate moving images in which the direction of light source varies gradually. Similarly, moving images exhibiting continuous change in the facial expression or motion of a human being or in an object can be created easily, using small data composed of images of eigenvectors.

According to the embodiment as described above, the original image as a whole is subject to principal component analysis and the images of eigenvectors are generated for the entire region. With this, it is possible to display images of eigenvectors that are meaningful to the user, facilitating selection of a desired image or adjustment of the coefficient. As a result, an intended image can be generated easily.

Pixels are extracted from the original images so as to form pixel sets. Principal component analysis is performed in units of pixel sets. This can prevent disadvantages such as shortage of memory capacity and resultant failure to load correlation matrixes in the memory, even if a high-resolution image is subject to the process. Consequently, this allows stable process not affected by the resources of the image processing device or the resolution of the images.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An image processing device comprising:
    a principal component analysis unit configured to subject a plurality of original images to principal component analysis;
    a display unit configured to display images of eigenvectors representing principal components obtained as a result of the principal component analysis; and
    an image generation unit configured to acknowledge user input related to adjustment of an image generated by using the images of eigenvectors, and to store the data for the image generated as a result in a storage device or to output the data to a display device,
    wherein the principal component analysis unit performs principal component analysis in units of pixel sets produced by retrieving a predetermined number of pixels identically located in the plurality of original images,
    the image processing device further comprising a synthesis unit configured to synthesize the eigenvectors to a size of the original images, by returning elements of the eigenvectors obtained for respective pixel sets to positions of the corresponding pixels,
    wherein the principal component analysis unit switches between (a) extracting pixels to form the pixel sets from random positions in an image plane of the original images, (b) extracting pixels to form the pixel sets at predetermined intervals in the image plane of the original images, and (c) extracting pixels to form the pixel sets by forming blocks of predetermined size, in accordance with a result of subjecting the original images to frequency analysis,
    wherein the pixel sets are formed until each pixel from the original images has been placed in a pixel set.

2. The image processing device according to claim 1, wherein the principal component analysis unit divides an image plane of the original images into blocks of a predetermined size and forms the pixel sets for the respective blocks.

3. An image processing method comprising:
    reading data for a plurality of original images from a storage device or an input device and subjecting the data to principal component analysis;
    causing a display device to display images of eigenvectors representing principal components, the images obtained as a result of the principal component analysis;
    acknowledging user input related to adjustment of an image generated by using the images of eigenvectors, and storing the data for the image generated as a result in a storage device or outputting the data to a display device;
    performing principal component analysis in units of pixel sets produced by retrieving a predetermined number of pixels identically located in the plurality of original images,
    and synthesizing the eigenvectors to a size of the original images, by returning elements of the eigenvectors obtained for respective pixel sets to positions of the corresponding pixels,
    wherein the principal component analysis switches between (a) extracting pixels to form the pixel sets from random positions in an image plane of the original images, (b) extracting pixels to form the pixel sets at predetermined intervals in the image plane of the original images, and (c) extracting pixels to form the pixel sets by forming blocks of predetermined size, in accordance with a result of subjecting the original images to frequency analysis.

4. A non-transitory computer-readable recording medium encoded with a computer program comprising:
    a principal component analysis module configured to read data for a plurality of original images from a storage device or an input device and subject the data to principal component analysis;
    a display module configured to cause a display device to display images of eigenvectors representing principal components, the images obtained as a result of the principal component analysis; and
    a processing module configured to acknowledge user input related to adjustment of an image generated by using the images of eigenvectors, and to store the data for the image generated as a result in a storage device or to output the data to a display device,
    wherein the principal component analysis module performs principal component analysis in units of pixel sets produced by retrieving a predetermined number of pixels identically located in the plurality of original images,
    the computer program further comprising a synthesis unit configured to synthesize the eigenvectors to a size of the original images, by returning elements of the eigenvectors obtained for respective pixel sets to positions of the corresponding pixels,
    wherein the principal component analysis module switches between (a) extracting pixels to form the pixel sets from random positions in an image plane of the original images, (b) extracting pixels to form the pixel sets at predetermined intervals in the image plane of the original images, and (c) extracting pixels to form the pixel sets by forming blocks of predetermined size, in accordance with a result of subjecting the original images to frequency analysis.

* * * * *